United States Patent [19]

Loudermilk

[11] 4,237,395
[45] Dec. 2, 1980

[54] ELECTRIC DYNAMOTOR

[76] Inventor: Billy E. Loudermilk, 310 Madison Ave., P.O. Box 1168, Cape Canaveral, Fla. 32920

[21] Appl. No.: 956,063

[22] Filed: Oct. 30, 1978

[51] Int. Cl.$^3$ .......................................... H02K 47/04
[52] U.S. Cl. ...................................... 310/113; 310/30; 310/138; 310/115
[58] Field of Search ............... 310/112, 113, 138, 115, 310/118, 46, 24, 30, 34, 35, 23

[56] References Cited

U.S. PATENT DOCUMENTS

| | | | |
|---|---|---|---|
| 1,889,208 | 11/1932 | Masterson et al. | 310/115 P |
| 1,893,629 | 1/1933 | Masterson et al. | 310/138 |
| 2,279,690 | 4/1942 | Lindsey | 310/46 |
| 4,019,103 | 4/1977 | Davis et al. | 310/24 X |

*Primary Examiner*—Donovan F. Duggan
*Attorney, Agent, or Firm*—Richard Dixon

[57] ABSTRACT

The present invention relates to a dynamo-electric machine which includes a plurality of permanent magnets arranged sequentially with like poles adjacent and spaced from each other by a plurality of spacers of magnetically soft material. Motive coils are located generally adjacent to the permanent magnets so that when energized one pole of the induced magnetic field will provide attractive forces toward one of the permanent magnets while the opposite pole of the induced magnetic field will produce repulsion forces from the like pole of the adjacent permanent magnet. A commutator device is provided for properly energizing selected ones of the motive coils in proper polarity. A plurality of generator coils are located adjacent to the permanent magnets for cutting the magnetic lines of flux emanating therefrom so as to generate an induced voltage at an output thereof responsive to the relative motion between the generator coils and the permanent magnets. The relative motion between the permanent magnets and the motive coils is limited to coplanar opposing motion for increasing the effective relative motion therebetween.

12 Claims, 6 Drawing Figures

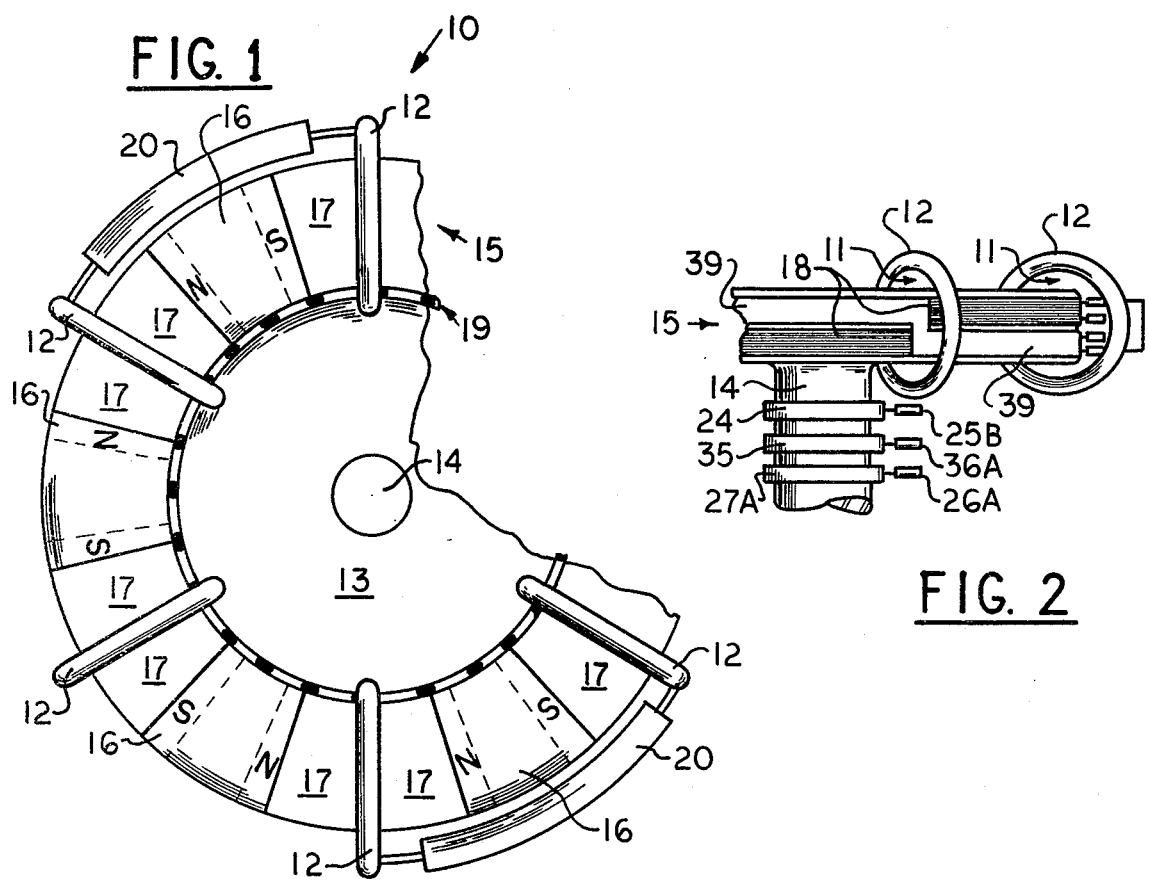
FIG. 1
FIG. 2
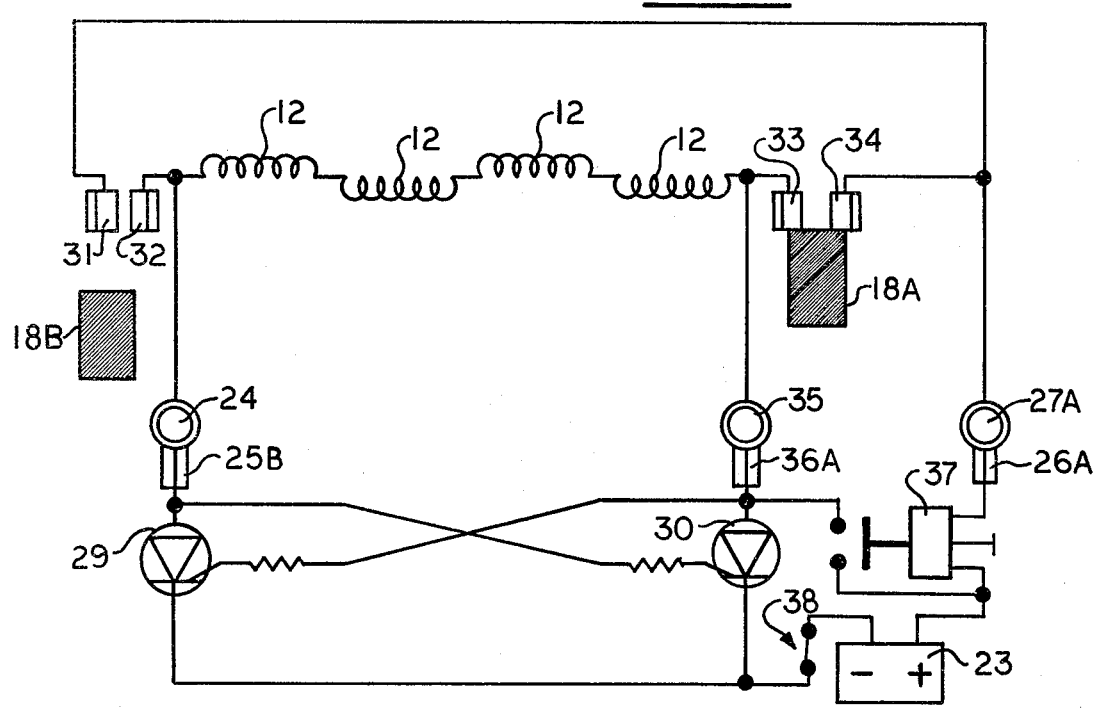
FIG. 3

ELECTRIC DYNAMOTOR

BACKGROUND OF THE INVENTION

I. Field of the Invention

The present invention relates generally to dynamo-electric machines, and more particularly dynamo machines in which the armature and the field are freely movable with respect to each other and with respect to a frame, and wherein voltage generating coils are disposed adjacent to the armature for cutting the magnetic lines of flux therefrom and generating an output voltage.

II. Brief Description of the Prior Art

As used herein the term dynamo will refer to an electro-magnetic machine which may be used either as a generator or as a motor or both simultaneously. The operation of the electro-magnetic machine is determined by the type of energy used to drive the machine and the type of energy which is obtained from the operation of the machine. For example, if electrical energy is delivered to the machine and mechanical energy is removed from the machine, then the machine will operate as a motor. Likewise, if mechanical energy is delivered to the machine and electrical energy is removed from the machine, then the machine will act as a generator. In some cases the machine may act both as a motor and as a generator, such as by delivering electrical energy to the machine and removing both electrical energy and mechanical energy therefrom.

The prior art is replete with designs for dynamo machines which usually comprise a rotor and stator, with one or both of such components having electrically induced magnetic poles. The magnetic flux lines emanating from the magnetic poles serve either to energize the rotational movement or to induce an electrical current in conductors provided adjacent thereto. For example, Busch, in U.S. Pat. No. 3,665,227, discloses an electro-magnetic machine which may be utilized either as a motor or as a generator, but not as both simultaneously. The electro-magnetic device includes generally stationary and C-shaped magnets which are arranged about the circumference of a circle. A plurality of coils are arranged around the circumference of a circle which communicates through the openings in the C-shaped magnets. If an electrical current is passed through the coils, then the electro-magnetic machine acts as a motor. Likewise, if mechanical energy is applied to the central shaft for rotating the coils through the permanent magnets, then the machine operates as a generator. While the elements and construction of this device are somewhat similar to the present invention, it does not provide for dynamo operation and does not include rotor and stator elements which are independently movable with respect to each other and with respect to a fixed point such as the frame.

Burtis, in U.S. Pat. No. 4,056,746, discloses an electric motor which includes a rotary armature and an annular field which is mounted for rotation about the armature. The annular field is geared to the armature through a planetary gear which is fixed to the housing so that the opposing torques of the field and the armature are summed at the motor output shaft. The counter-rotating elements provide for an increase in the flux cutting speed of the motor. While the elements and the construction of this motor are similar to the present invention, it does not provide for dynamo operation since no additional field windings are provided for generating an output voltage subsequent to intersecting the moving lines of magnetic flux.

Various other prior art references which are hereby made of record include U.S. Pat. Nos. 3,909,647, 3,354,333, 255,137 and 279,476. The applicant herein has examined each of these references but does not believe that they add anything to the references cited and discussed above.

SUMMARY OF THE INVENTION

The present invention relates to an electric dynamotor machine which includes a plurality of O-shaped motive coils each coupled in sequential registration about the circumference of a generally circular motive hub having an axial shaft of rotation communicating therethrough. A ring-shaped rotor communicates through the voids within the O-shaped motive coils. The rotor includes a plurality of permanent magnets with like poles located adjacent each other and spaced from each other by spacers formed of a soft magnetic material. Counter-rotation members are operatively coupled between the hub and the rotor for rendering the rotor movable only in a direction opposite to the rotation of the motive coils and the hub. Commutator means are provided for periodically energizing selected ones of the motive coils in proper polarity. A plurality of generator coils are juxtaposed with the circumference of the rotor for cutting the magnetic lines of flux emanating from the permanent magnets so as to generate an induced voltage at an output thereof responsive to the relative motion between the generator coils and the permanent magnets.

BRIEF DESCRIPTION OF THE DRAWINGS

Other objects, features and advantages of the present invention will be apparent from the following description of certain preferred embodiments thereof as described in conjunction with the accompanying drawings. Variations and modifications may be effected without departing from the spirit and scope of the concepts of the disclosure, as defined by the appended claims. In the drawings like reference characters refer to like parts throughout the several views which include:

FIG. 1 illustrates a partial frontal view of a first preferred embodiment of a rotary dynamotor in accordance with the teachings of the present invention.

FIG. 2 illustrates a partial top view of the first preferred embodiment of the present invention.

FIG. 3 illustrates a partial schematic diagram of the electrical connections suggested by the operation of the first preferred embodiment of the present invention.

Figure 5:
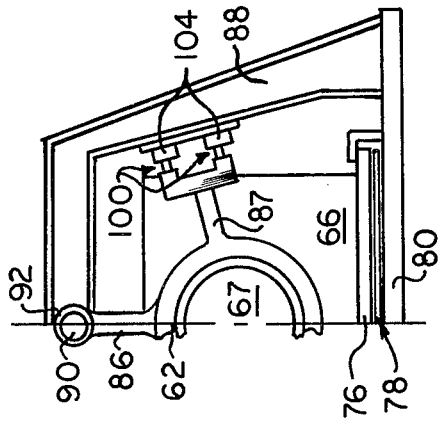
FIG. 5 illustrates an end view of the second preferred embodiment of the invention.

It should be observed that the elements and operation of the embodiments of the present invention have been illustrated in simplified form in each of the drawings in order to eliminate unnecessary and complicating details which would be apparent to one skilled in this art. Therefore, it will be apparent that other specific forms and constructions of the invention will be equivalent to the embodiments described although departing somewhat from the exact appearance of the drawings.

DETAILED DESCRIPTION OF THE PREFERRED EMBODIMENT

A first preferred embodiment of a rotary form of the present invention is illustrated generally as 10 in FIG. 1. This counterrotating dynamo 10 includes a plurality of magnetic coils 12 that are arranged about the circumference of a non-magnetic hub 13 which rotates about a central shaft 14 affixed thereto. Each of the magnetic coils 12 is disposed outwardly in a radial fashion from the hub 13 so that it is rigidly supported thereby. In this manner the voids 11 defined within each of the generally O-shaped motive magnetic coils 12 define a ring about the circumference of the hub 13.

A multiple pole, ring-shaped rotor 15 communicates through the voids 11 of the motive coils 12. This rotor includes a plurality of circumferentially arranged permanent bar magents 16. Each of the adjacent magnets 16 are arranged such that adjacent poles have the same magnetic polarity. A plurality of spacers of magnetically soft material 17 are interposed between adjacent ones of the permanent magnets so as to form a generally continuous unit which rotates in fine balance. A plurality of non-magnetic bearings 19 are coupled between the inner surface of the rotor 15 and the outer surface of the hub 13. These bearings 19 enable the rotor 15 to rotate in a direction opposite to the rotation of the hub 13, thereby effectively increasing the apparent motion differential between the motive coils 12 and the permanent magnets 16. The bearings 19 further restrict the movement of the rotor 15 to a plane generally coincident with the plane of the hub 13, which is generally perpendicular to the longitudinal axis of the shaft 14.

A plurality of generator coils 20 are operatively juxtaposed along the outer circumferential surface of the rotor 15, typically by being secured between the distended sections of adjacent ones of the motive coils 12. A plurality of these coils 20 may be located adjacent the circumference of the rotor 15 in order to provide additional voltages which may be the same as or different from the other generator coils of similar function. The adjacent motive coils 12 are generally wound in opposite directions and then these windings are connected in series. In this manner when the motive coils 12 are bisecting the spacers 17 between like poles of adjacent ones of the permanent magnets 16, the electrical current from an external power source will flow through the motive coils 12 in the proper direction in order to create a magnetic field of the correct polarity in each motive coil 12 such that each of the coils is repelled from one permanent magnet 16 and at the same time is attracted toward the adjacent permanent magnet on the other side of the coil. This simultaneous attraction and repulsion force between the adjacent magnets 16 and the motive coil 12 causes the rotor 15 to rotate in a preferred direction. These magnetic forces also cause the hub 13 and the shaft 14 connected thereto to rotate in the opposite direction.

In order to maintain constant and maximum torque, each dynamotor machine 10 is designed with an equal number of motive coils 12 and permanent magnets 16, with six of each being utilized in the first preferred embodiment of the present invention. Also, a plurality of counterrotating electric dynamotors 10 could be coupled together by merely placing additional hubs 13, and rotors 15 coupled thereto, along the central shaft 14 and connecting the corresponding motive coils 12 to induce the same preferred direction of rotation in each of the dynamotor elements 10.

The dynamotor 10 may be utilized to provide mechanical power by coupling a mechanical load to the shaft 14. In the alternative, or simultaneously, the output voltage from the generating coils 20 may be coupled to a electrical load for supplying electrical energy thereto. The electrical energy is derived from the generating coils 20 as they cut through the magnetic lines of flux emanating from the permanent magnets 16 in the rotor 15 as they pass adjacent thereto.

The counter-EMF generated by the generator coil 20 as it cuts the lines of magnetic flux from the permanent magnet 16 will produce a force which opposes the rotational motion of the rotor 15, the hub 13 and the shaft 14. This counterrotational force may be utilized to control the rotational speed of the shaft 14 by coupling an electrical load of appropriate resistance to the output of the generator coils 20. Another method of controlling the speed of rotation of the shaft 14 is to regulate the magnitude of the current flowing through the motive coils 12. The speed of rotation of the shaft 14 may be important for driving a constant speed load or for producing a voltage output from the generating coils 20 which is of proper and precisely controlled frequency.

The counterrotation of the rotor 15 and the generator coils 20, which are attached to the motive coils 12 and the hub 13, produces an output voltage in the generator coils 20 which is dependent upon the effective relative motion between these elements. The power available from the generating coils 20 is proportional to the rate at which the magnetic lines of flux are being cut, with the relative counterrotation inducing a greater voltage than the rotation of a movable rotor with respect to a fixed field coil.

The spacers 17 may be constructed of a magnetically soft material, such as laminated sheets of soft iron. The spacers 17 tend to elongate the magnetic flux lines emanating from the permanent bar magnets 16 to provide a larger flux field for being cut by the plane of the generator coils 20. The spacers 17 also serve to effectively increase the strength of the magnetic field emanating from the motive coils 12 at times when the motive coils 12 are bisecting the distance between adjacent ones of the permanent magnets 16. In this manner the attraction and repulsion forces become stronger with the increased proximity to the effective location of the magnetic pole of the permanent magnets 16.

The over all smoothness and efficiency of the counterrotating electric dynamotor is also increased by the flywheel effect caused by the effective mass of the rotating rotor 15, as well as the masses of the hub 13, the motive coils 12 and the generator coils 20. These effective masses tend to reduce the abrupt changes in motion which can occur through the instantaneous addition of mechanical or electrical loads to the output of the electric dynamotor 10.

With reference to FIG. 2, a plurality of alternating switching strips 18 are located about the circumference of the rotor 15. These current switching strips 18 are electrically coupled to the adjacent ones of the motive coils 12 for providing electrical energy thereto. The current switching strips 18 are alternately located about opposite sides of the width of the rotor 15 adjacent to the spacers 17 of magnetically soft material. There is typically a gap between the end of one current switching strip 18 and the beginning of another so that electrical energy is removed from the motive coils 12 for a short period of time before the coil is re-energized generally in the reverse direction.

The electrical operation of the first preferred embodiment of the rotary electric dynamotor may be best described through a continuing reference to FIGS. 1 and 2 and new reference to FIG. 3 which illustrates a simplified electrical functional diagram of the present invention. It will first be assumed that the on/off power switch 38 is closed and that the current switching strip 18A is making contact with brushes 33 and 34. Under these conditions the SCR 29 will be conducting. The flow of current will then be enabled from the positive terminal of a source of external power 23, through the brush 26A, through the slip ring 27A, through the brush 34, through the switching strip 18A, through the brush 33 and into the motive coils 12. The return flow of the current will proceed through the slip ring 24, through the brush 25B, through the SCR 29 and into the negative terminal of the external power source 23.

After the current switching strip 18A loses contact from beneath the brushes 33 and 34, the current flow from the right to the left of the motive coils 12 as viewed in FIG. 3, will cease, and the SCR 29 stops conducting. Then, when the alternate current switching strip 18B, located adjacent to the bar of magnetically soft material 17, communicates with brushes 31 and 32, the SCR 30 will begin conducting. The current will flow from the positive terminal of the external power source 23, through brush 26A, through slip ring 27A, through brush 31 and into current switching strip 18B, through brush 32 and then into the motive coil 12. The return flow of the current will proceed from motive coil 12 through slip ring 35, through brush 36A, through SCR 30 and into the negative terminal of the external power source 23.

As the rotation of the rotor 15 causes the current switching strip 18B to lose electrical communication with brushes 31 and 32, the current flow from the left to the right of motive coils 12 will end and SCR 30 will stop conducting to complete the current reversing cycle through the motive coils 12. Then, when the next current switching strip 18A electrically communicates with brushes 33 and 34, the cycle for energizing the appropriate ones of the motive coils 12 will begin again as SCR 29 conducts and so forth.

There are typically a total of six alternate current switching strips 18 equally but alternately spaced about the outer circumference of the rotor 15. On the opposite side from each of the current switching strips 18 is located a strip of insulating material 39 to prevent the flow of current between the contact brush pairs 31 and 32 and contact brush pairs 33 and 34.

The current switching strips 18 do not overlap each other, but instead are separated by a narrow gap as previously explained. In the unlikely event that the counterrotating dynamo electric machine 10 stops with the brushes 31 and 32 or brushes 33 and 34 both communicating within these narrow gaps, the operator may depress momentarily the start switch 37 to supply a torque impulse to the rotor 15, which will cause one pair of brushes to communicate with the appropriate one of the current switching strips 18.

With the current switching strips 18 being equally spaced on the outer circumferential surface of the rotor 15, and with the motive coils 12 being equally spaced about the circumference of the rotor 15, the precision timing for the application of electrical energy to the motive coils 12 will always be in proper synchronization for assuring the proper direction of rotation of the rotor 15. Under normal operation current flows through the motive coils 12 for the entire period of time during which the coil is adjacent to one of the spacers 17, but current generally does not flow through the motive coil 12 when it is adjacent to one of the permanent magnets 16.

Figure 4:
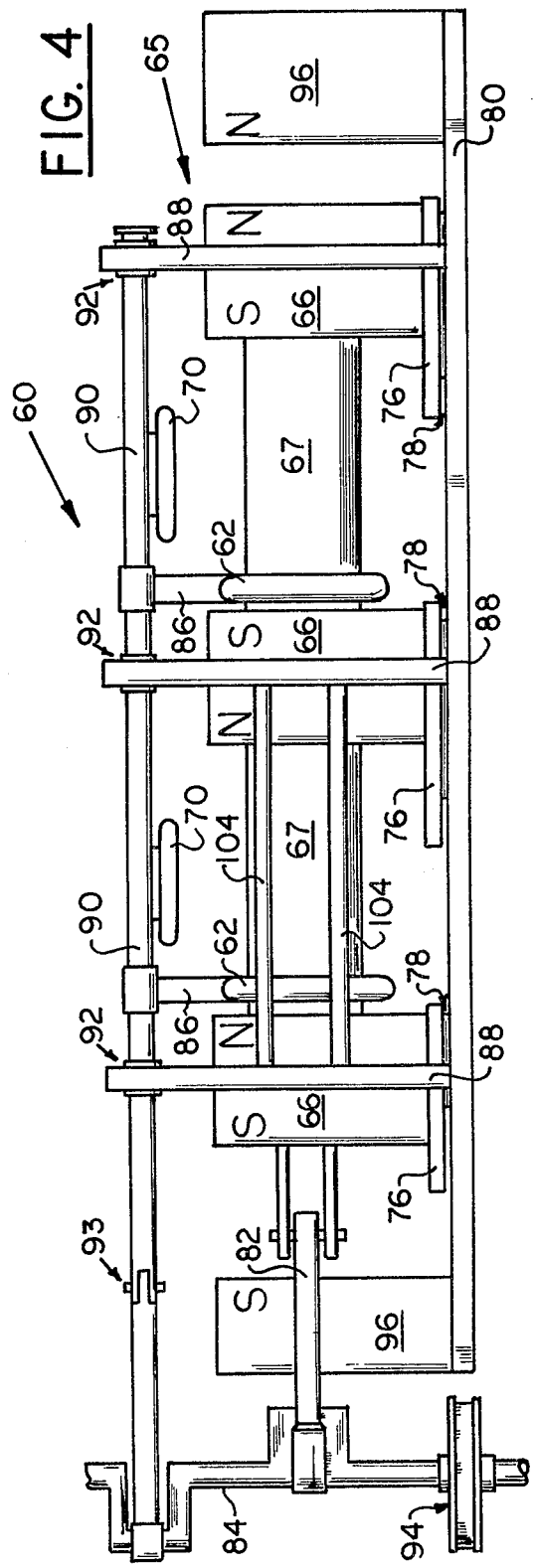
FIG. 4 illustrates a frontal elevation of a second preferred embodiment of a linear dynamotor in accordance with the teachings of the present invention.

A second preferred embodiment of the present invention is illustrated generally as 60 in FIG. 4. The second preferred embodiment differs generally from the first preferred embodiment in that rather than featuring a circular construction for the rotor, permanent magnets, spacers and motive coils, the second preferred embodiment arranges these elements generally in a linear fashion and then operatively converts the linear opposing motion between the elements into rotary energy through the use of a crankshaft.

The second preferred embodiment includes a linear "rotor" 65 which includes a plurality of permanent magnets 66 which are arranged in a linear fashion with adjacent sides thereof representing like magnetic poles. A plurality of spacers 67, consisting of a relatively soft magnetic material, are interposed between these adjacent magnets 66 in order to form a single unit 65 which operates in a fashion similar to the rotor of the first preferred embodiment. As used with the description of the second preferred embodiment, the term "rotor" will refer to the combination of the permanent magnets 66 and the spacers 67 even though these elements do not rotate about an axis as with the first preferred embodiment.

Each of the permanent magnets 66 is attached to a base 76 which is movably coupled to a unitized frame 80 by a plurality of nonmagnetic bearings 78. In this manner the entire system of permanent magnets 66, spacers 67 and bases 76 are coupled together as a unitary rotor 65 so as to move linearly during the operation of the reciprocating electric dynamotor 60. This rotor unit 65 is coupled through a linkage 82 to a first journal to a crankshaft 84 in order to produce a rotation thereof responsive to the linear motion of the rotor 65.

A plurality of motive coils 62 are each coupled about a corresponding one of the spacers 67 so as to reciprocate between the like poles of the adjacent ones of the permanent magnets 66 when a voltage of the proper polarity is applied to the inputs of the coils 62. Each of the motive coils 62 is coupled through a distended arm 86 to a motive frame 90. Paired legs 88 of the main frame 80 are movably coupled to the motive frame 90 through a plurality of bearings 92. One end of the motive frame 90 is coupled through a wrist pin and linkage 93 to a separate journal on the crankshaft 84. In this manner the motive frame 90 is free to move in a linear fashion independent of the motion of the rotor's magnets and spacers in order to produce a rotation of the crankshaft 84.

A plurality of generator coils 70 are each attached to the motive frame 90 at a point generally adjacent to either the permanent magnets 66 or the spacers 67. While in FIG. 4 the location of the generator coils 70 is depicted as being generally adjacent to the spacers 67, the actual location of each of the generator coils 70 may be spaced along the length of the motive frame 90 so as to produce the proper waveform and magnitude as required for the specific application. The purpose of the generator coils 70 is to cut the lines of magnetic flux communicating between dissimilar poles of the permanent magnets 66 so as to induce a voltage at the outputs of the coils 70 which are then connected to electrical loads in a manner similar to the first preferred embodiment as previously described.

The second preferred embodiment of the linear dynamo-electric machine is primarily designed for use in relatively slow speed applications. Because the voltage generating coils 70 are moving in one direction and the permanent bar magnets 66 and the magnetic flux emanating therefrom are moving in the opposite direction, the opposing motion effectively increases the rate of the flux cutting by the voltage generating coils 70, and therefore produces an unexpectedly larger voltage output from the electric dynamotor.

A flywheel 94 is shown as being coupled to the crankshaft 84 for storing and integrating the reciprocating energy received from the rotor 65 and the motive frame 90. The throw of the separate journals of the crankshaft controls the distance that the motive coils 62 and the permanent magnets 66 travel in their reciprocating movements. The motive coils 62 are generally energized for nearly the entire period of travel in one direction between the adjacent permanent magnets 66, and then the direction of the electrical current through the motive coils 62 is reversed for the second half of the reciprocating cycle.

As illustrated in FIG. 4, two damper permanent magnets 96 are secured to the main frame 80 near the extreme limits of travel of the two end permanent magnets 66. These damper magnets 96 have like poles which face the adjacent movable permanent magnets 66 so as to provide a spring-like action as these movable magnets approach the fixed magnets.

Figure 6:
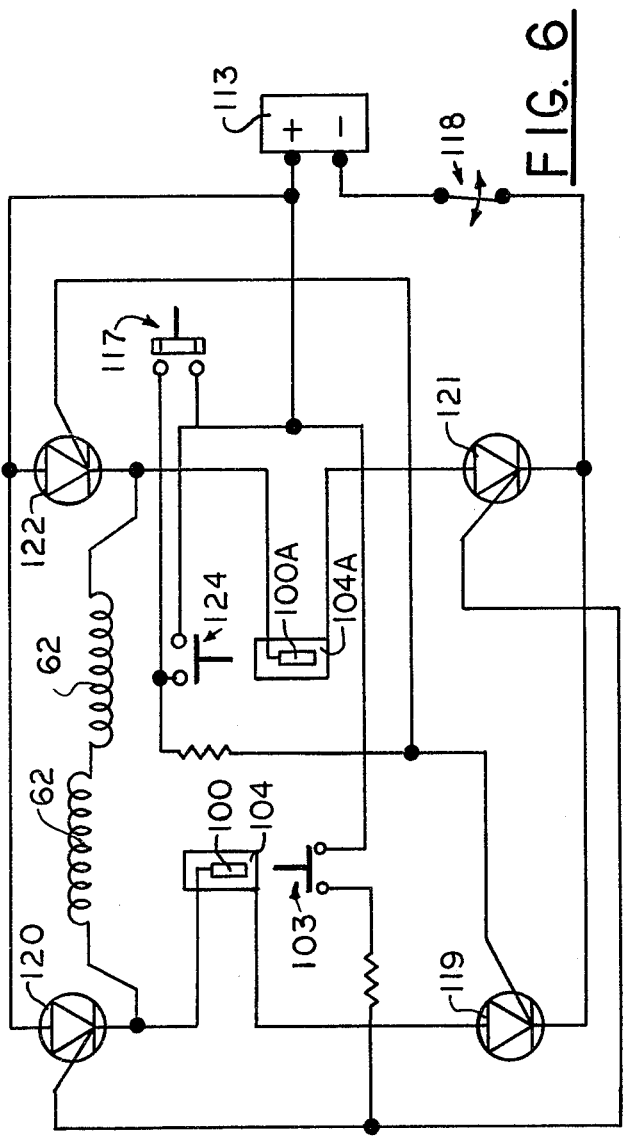
FIG. 6 illustrates a partial schematic diagram of the electrical connections suggested by the operation of the second preferred embodiment of the present invention.

With additional reference to FIGS. 5 and 6, the motive coils 62 include an additional arm 87 which includes at a distended end thereof a pair of contact brushes 100 that are in operative sliding communication with current strips 104 which are coupled to the adjacent ones of the base legs 88. A plurality of SCR's 119, 120, 121 and 122 are coupled across a DC power supply 113 in series with the motive coils 62 in order to controllably reverse the flow of current therethrough in precise registration with the location and opposing directional motion between the motive frame 90 and the magnets 66.

With reference to FIG. 6, the contact switches 103 and 124 are illustrated as being physically and operationally located adjacent to the brushes 100 and 100A respectively. It is envisioned that as the permanent magnets 66 approach the maximum excursion of their travel, which is typically in registration with the brush 100 reaching the limit of its travel on the current switching strip 104, then the magnet 66 will contact the extended arm of the switch 103, thus turning on SCR 120 and 121. In a similar manner as the permanent magnet 66 reaches the other end of its excursion, which is in registration with the brush 100A reaching the limit of its travel along the current strip 104A, then the permanent magnet 66 will contact the exposed lever arm of switch 124, which will then turn on SCRs 119 and 122. It should be recalled from the above discussion that the previously conducting SCRs were deactivated or turned off by the brushes 100 and 100A traveling off the end of their respective current limit strips 104 and 104A, for the proper direction and excursion of travel.

With continuing reference to FIGS. 6 and 5, it will first be assumed that the on/off switch 118 is closed and the motive coils 62 are stopped midway between the adjacent permanent magnets 66 so that the appropriate brushes 100 and 100A are both in contact with the corresponding current strips 104 and 104A. As the start switch 117 is energized, the SCR's 119 and 122 begin to conduct. Current flows from the external power source 113 through SCR 122, through the motive coils 62, which are wound in opposite directions to each other, through contact brush 100, through the current strip 104, through SCR 119 and back to the negative terminal of the source of electrical energy 113. The current strips 104 and 104A are of the same length but are offset from each other in a linear direction by a small distance.

As the contact brush 100 communicates along the current strip 104 it will eventually run off the current strip, which will interrupt the flow of current through SCR 119 and 122. During the return travel the electrical current will flow from the positive terminal of the power source 113, through the SCR 120, through the motive coils 62, through the contact brush 100A, through the current strip 104A, through SCR 121 and back into the negative terminal of the power source 113. It will be noted that this current flow through the motive coils 62 is reversed when compared to the previous half-cycle. This change in polarity causes a reversal of the induced magnetic field about the motive coil 62, thereby causing the motive frame 90 to move in the opposite direction as compared to the previous half-cycle.

While FIGS. 4, 5 and 6 illustrate the use of three permanent magnets 66, two spacers 67, two motive coils 62 and two generator coils 70, it will be apparent that additional modules of this type may be coupled to the motive frame 90, or coupled to the crankshaft 84, as long as the proper linear and rotational progressions are observed. In this manner the output power of the device may be increased.

The permanent bar magnets 66 and 96 as described above are typically ceramic magnets having the magnetic poles juxtaposed with the largest surface areas thereon. However, any type of good permanent magnet may be used.

In addition to the applications previously discussed, the present invention may also be used as a model to demonstrate the scientific principles of magnetism, motors and generators. The present invention could also be built with transparent exterior-covering parts in order to be used as an educational toy for amusing young children.

In accordance with the provisions of the United States Patent laws, two preferred embodiments of the present invention have been described in detail and the principles of the inventon have been described in the best mode in which it is now contemplated that such principles may be applied. However, it will be understood that the construction shown and described in the attached specification and the drawings are merely illustrative and that the invention is not limited thereto. Accordingly, alterations and modifications which readily suggest themselves to persons skilled in the art, without departing from the true spirit of the disclosure herein, are intended to be included in the scope of the following claims.

I claim:

1. An electric dynamotor machine comprising in combination:
   a motive hub having an axial shaft of rotation attached thereto;

a plurality of annular motive coils each defining a void therein, with each of said coils coupled in sequential registration about the circumference of said motive hub;

a ring-shaped rotor encircling said hub and communicating through said voids within each of said motive coils, said rotor including a plurality of permanent magnets arranged sequentially about the circumference of said rotor with like poles adjacent each other;

counter-rotation means operatively coupled between the plurality of said motive coils and said rotor for rendering said rotor movable only in a direction opposite to the rotation of said motive coils and said hub;

commutator means operatively coupled between a source of electrical energy and said motive coils for periodically energizing selected ones of said motive coils in proper polarity; and a plurality of generator coils operatively juxtaposed with the circumference of said rotor for cutting the magnetic lines of flux emanating from said permanent magnets therein so as to generate an induced voltage at an output thereof responsive to the relative motion between said generator coils and said permanent magnets.

2. The electric dynamotor machine as described in claim 1 wherein:

the spacing between said adjacent ones of said permanent magnets is substantially larger than the thickness of each of said motive coils.

3. The electric dynamotor as described in claim 2 wherein each of said generator coils is coupled between the distended sections of adjacent ones of said motive coils at a position adjacent to the outside circumference of said rotor.

4. The electric dynamotor machine as described in claim 1 wherein said rotor further includes a plurality of spacers of soft magnetic material operatively coupled between said adjacent poles of said permanent magnets.

5. A dynamo-electric machine comprising in combination:

a rotatable motive hub having an axial shaft of rotation attached thereto;

a rotor movably encircling said hub, with said rotor including a plurality of permanent magnets arranged about the rotor with like poles adjacent each other;

a plurality of motive coils coupled in sequential registration about said motive hub such that when each is energized one pole of the induced magnetic field will produce attractive forces toward one of said permanent magnets while the opposite pole of the induced magnetic field will produce repulsion forces from said like pole of an adjacent one of said permanent magnets;

commutator means operatively interposed between a source of electrical energy and said motive coils for periodically energizing selected ones of said motive coils in proper polarity; and a plurality of generator coils operatively juxtaposed adjacent said permanent magnets of said rotor for cutting the magnetic lines of flux emanating therefrom so as to generate an induced voltage at an output thereof responsive to the relative motion between said generator coils and said permanent magnets.

6. The dynamo-electric machine as defined in claim 5 further including:

counter-motion means operatively coupled between said plurality of motive coils and said plurality of permanent magnets for enabling only opposing relative motion therebetween, thereby increasing the effective relative speed between said motive coils and said permanent magnets.

7. The dynamo-electric machine as described in claim 5 further including a plurality of spacers of magnetically soft material operatively interposed between the like poles of each of said adjacent permanent magnets, and wherein said permanent magnets and said spacers are closed coupled about the circumference of a circle for forming said rotor of permanent magnets which operatively rotates through said motive coils.

8. The dynamo-electric machine as described in claim 5 wherein each of said generator coils is spaced about the circumference of said rotor between adjacent ones of said motive coils.

9. The dynamo-electric machine as described in claim 5 wherein the effective size of each of said motive coils is much smaller than the effective separation between adjacent ones of said permanent magnets.

10. The dynamo-electric machine as described in claim 9 wherein said plurality of generator coils include coils of different effective windings for generating different output voltages of the same frequency.

11. The dynamo-electric machine as described in claim 5 wherein each of said motive coils is wound around a central void through which said rotor communicates.

12. An electric dynamotor machine comprising in combination:

a longitudinally movable shaft having a plurality of magnets coupled thereto so as to be arranged with like poles adjacent each other and spaced apart by a plurality of spacers of soft magnetic material interposed therebetween;

a plurality of motive coils defining a void therein, with said coils being juxtaposed with said magnets such that said magnets reciprocate through said void therein;

commutator means operatively coupled between a source of electrical energy and said motive coils for periodically energizing selected ones of said motive coils in proper polarity so as to cause said magnets and said shaft to reciprocate through said void in said motive coils; and a plurality of generator coils operatively juxtaposed with said magnets for cutting the magnetic lines of flux emanating from said magnets so as to generate an induced voltage and an output thereof responsive to relative motion between said generator coils and said permanent magent.

* * * * *